June 7, 1927.
J. R. CARROLL
1,631,854
MACHINE FOR CORING AND DERINDING FRUIT
Original Filed July 3, 1925
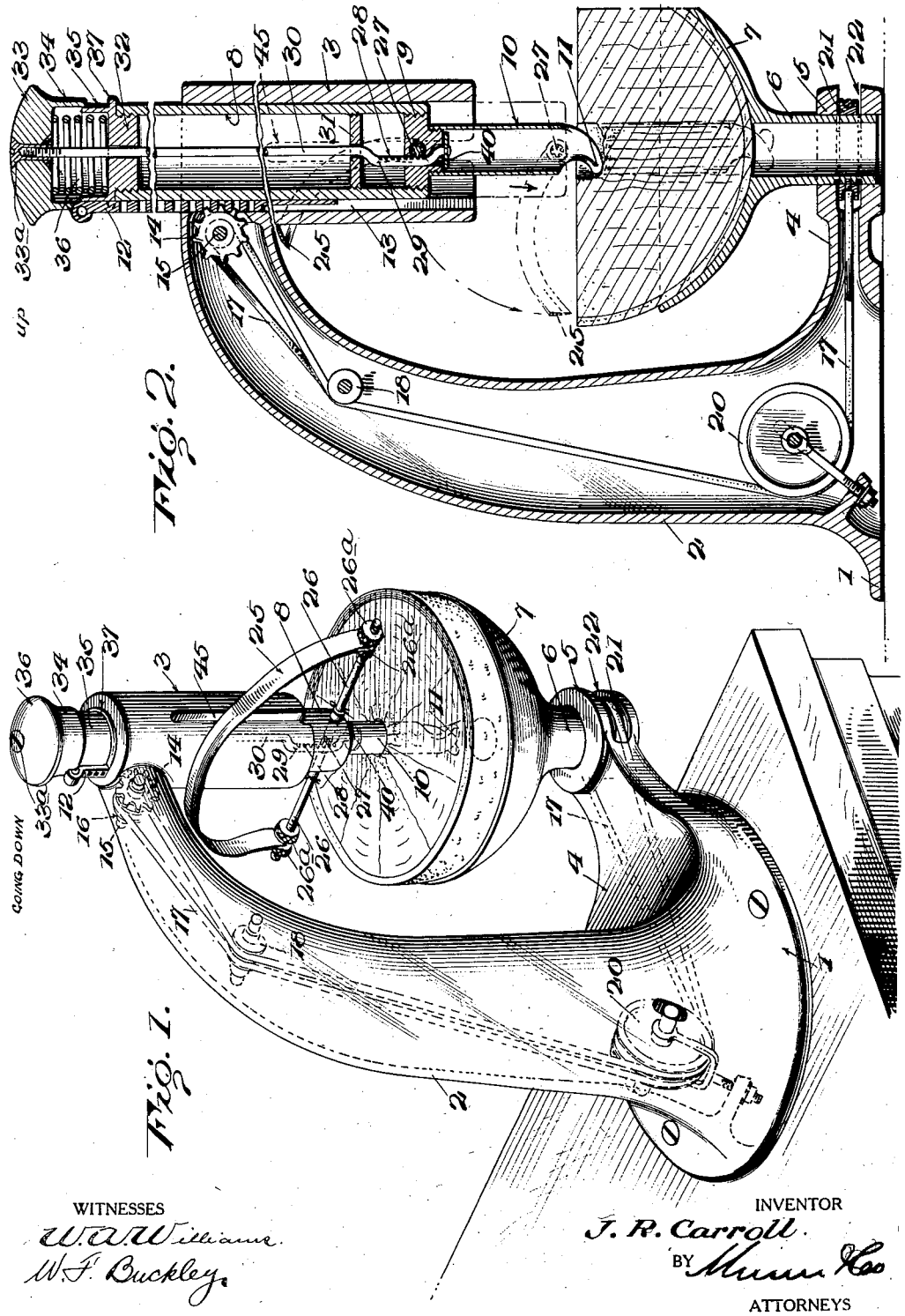
WITNESSES
INVENTOR
J. R. Carroll
BY
ATTORNEYS Patented June 7, 1927.

1,631,854

UNITED STATES PATENT OFFICE.

JOHN RAYMOND CARROLL, OF SOUTH MOUNTAIN, PENNSYLVANIA, ASSIGNOR OF ONE-HALF TO ALBERT C. BAURELIE, OF SOUTH MOUNTAIN, PENNSYLVANIA.

MACHINE FOR CORING AND DERINDING FRUIT.

Application filed July 3, 1925, Serial No. 41,401. Renewed November 23, 1926.

This invention relates to an improvement in machines for coring and derinding fruit, especially grapefruit, or the like.

The object of the invention is to provide a machine of this character which may be easily and conveniently operated to rapidly core and derind the fruit without the necessity of handling or touching the meat of the fruit and in such a novel and effective manner as to preserve the appearance of the meat of the fruit and retain the juice therein. In this manner the fruit is not only prepared for consumption but is made pleasing and appetizing in appearance.

A further object resides in the provision of a machine having the advantages and capacities specified and which is of simple and durable construction, reliable and effective in operation and easy and comparatively inexpensive to manufacture.

Other objects and advantages reside in certain novel features of the construction, arrangement and combination of parts which will hereinafter be more fully described and particularly pointed out in the appended claims, reference being had to the accompanying drawings forming a part of this specification, and in which:

Figure 1 is a perspective view showing one embodiment of the invention, and

Figure 2 is a view in central vertical longitudinal section through the machine shown in Figure 1.

Referring to the drawing, the numeral 1 designates a base from which a hollow supporting arm 2 extends upwardly. The upper end of the arm 2 is curved laterally or horizontally over the base and has integrally formed therewith a tubular bearing 3. The base 1 has a supporting bracket 4 integrally formed therewith or rigidly connected thereto and underlying the bearing 3. The bracket 4 has a bearing 5 therein which is aligned with the bearing 3. In the bearing 5 a tubular post 6 is rotatably fitted. A fruit support which may comprise a bowl 7 is integrally formed with or suitably connected to the upper end of the post 6.

For the purpose of coring the fruit contained in the bowl 7 a vertically reciprocable shaft or operating element 8 is slidably fitted in the tubular bearing 3. At its lower or forward end the shaft 8 is connected, as at 9, to the upper end of a hollow coring tool, designated at 10. At its lower or forward end the coring tool 10 has coring blades or bits 11. When the shaft or element 8 is moved downwardly through the bearing 3 the blades 11 of the coring tool 10 engage the grape-fruit or other fruit around the core and at this time it is proposed to rotate the bowl 7 and consequently the grape-fruit to facilitate the removal of the core from the fruit by the blades 11. In carrying out this purpose a rack 12 is secured to a knob 33 mounted on the upper end of the shaft 8 in a manner to be hereinafter more fully described and the rack 12 operates in a slot 13 provided in a tubular bearing 3. The rack 12 co-acts with a gear wheel or pinion 14 fixed on the shaft 15 rotatably mounted in the horizontal portion of the supporting arm 2. A pulley 16 is also fixed to the shaft 15 and around the pulley 15 a belt 17 is trained, the belt 17 passing over a guide sheave or pulley 18, a tensioning pulley 20 and a driven pulley 21. The driven pulley 21 is fixed on the post 6 and is accommodated in a slot 22 provided in the bracket 5. In the arrangement shown the pulley 21 which is provided with a peripheral groove to receive the belt 17 not only serves to take the motion from the belt to transmit it to the post and its bowl 7 but also serves as a thrust collar to hold the post and the bowl against axial displacement. It will now be understood that when the shaft or element 8 is moved downwardly that the coring tool 10 not only advances through the half grape-fruit but the grape-fruit is rotated to enable the blades 11 of the coring tool to more easily and more cleanly cut the core from the fruit. The core which is severed from the fruit passes up into the hollow coring tool 10.

In order to effect derinding of the fruit a suitably shaped and curved derinding knife 25 is provided. The opposite ends of the knife are adjustably fixed by knurled thumb nuts 26ª to the outer ends of the shaft 26 which is journaled in bearings provided therefor in the shaft or element 8. The shaft 26 extends at right angles to the shaft or element 8. The portion of the shaft 26 which lies within the element 8 is provided with a pinion 27 which meshes with a rack 28 formed on an offset portion 29 of a reciprocable rod 30. The rod 30 is mounted for reciprocatory movement in a guide plate 31 and in a head 32. The guide plate 31 is located within the shaft 8 and the head 32 is connected to the upper end of the shaft 8, as clearly shown in Fig. 2 of the drawing. The upper end of the rod 30 projects above the head 32 and is threadedly connected to an adjusting bushing 33ª mounted on the operating knob 33. The bushing 33ª has a slot in its closed end whereby it may be turned to adjust the limit of the downward swing of the knife 25. The knob 33 has a downwardly extending annular flange 34 which telescopes on or slidably fits over an upwardly directed annular flange 35 formed on the head 32. Within the space defined or enclosed by the flanges 34 and 35 a coil spring 36 is disposed and has one end abutting the knob 33 and its other end abutting the head 32. The head 32 has an outwardly directed annular flange or collar 37 which is engageable with the upper end of the bearing 3 to limit the downward movement of the shaft 8. At the lower end of the rod 30 a core ejector plate 40 is secured and has a sliding fit in the coring tool 10.

When the knob 33 is pressed downwardly to move the shaft 8 down so as to advance the coring tool 10 through the grape-fruit and rotate the bowl 7 whereby to sever the core from the grape-fruit and cause it to pass into the hollow tool 10, the spring 36 remains expanded (it being sufficiently strong for this purpose) and consequently the sleeve 34 does not slide down over the sleeve 35 during the coring action. When the core has been completely severed from the fruit and the blades 11 have passed through the rind of the fruit the collar or outwardly directed annular flange 37 of the head 32 engages the upper end of the sleeve bearing 3 to positively prevent further downward movement of the shaft 8. Now then, as pressure is still applied to the knob 33 the spring 36 will be compressed and the knob 33 will move down relative to the shaft 8, the flange 34 sliding down over the flange 35 at this time. Downward movement of the knob 33 relative to the shaft 8 causes the rod 30 to move downwardly relative to the shaft 8 and consequently causes the rack 28 and the offset portion 29 of the rod 30 to rotate the pinion 27 and consequently the shaft 26 in such a manner as to swing the knife 25 down between the rind and the fruit while the bowl 7 rotates to such an extent as to completely remove the rind from the fruit. As the rind has been removed from the fruit the core which has been severed from the fruit is expelled from the coring tool 10 down through the hollow post 6 into a suitable container.

Slots 45 are provided to accommodate the transverse knife shaft 26 when the shaft 8 and knob 33 are in their uppermost position.

In order to insure successful operation in practice it is necessary to step up the drive from the rack 12 to the pulley 21 and for this purpose the gearing between the rack 12 and the pulley 21 is of such a character as to cause the pulley 21 to move at approximately three times the speed of the rack.

I claim:

1. In a machine of the character described, a support for the fruit, a coring tool, a reciprocable shaft carrying said tool, an operating member at one end of said shaft, yieldable means between the operating member and the shaft, means for limiting the movement of the shaft, and ejecting means cooperable with the coring tool and actuated from the operating member when the same moves toward the shaft.

2. In a machine of the character described, a rotatable support for the fruit, a coring tool, means for advancing the coring tool through the fruit, means for rotating the support and consequently the fruit as the coring tool is advanced therethrough, a derinding knife shaped to pass between the rind and the meat of the fruit, and means for swinging the derinding knife down through the fruit after the coring operation has been completed and while the support and the fruit are still being rotated.

3. In a machine of the character described, a support for the fruit, a curved derinding knife consisting of a strip-like blade of approximately semi-circular form adapted to pass bodily between the meat of the fruit and the rind, means cooperable with the ends of the blade for mounting the knife for swinging movement, and means for swinging the knife.

4. In a machine of the character described, a support for the fruit, means for mounting the support for rotary movement, a coring tool, a vertically reciprocable shaft carrying said tool, an operating member at the upper end of said shaft, spring means between the operating member and the shaft, means for limiting the downward movement of the shaft, a rack connected to the operating member, a pinion operated from the rack, motion transmission means between the pinion and the support for turning the support when the operating member and shaft are moved downwardly, a derinding knife mounted on the shaft for swinging movement, and means for actuating the derinding knife from the operating member when the same moves toward the shaft upon compression of the spring means between the operating member and the shaft and after the movement of the shaft has been stopped.

5. In a machine of the character described, a support for the fruit, means for mounting the support for rotary movement, a hollow coring tool, a vertically reciprocable shaft carrying said tool, an operating member at the upper end of said shaft, spring means between the operating member and the shaft, means for limiting the downward movement of the shaft, a rack connected to the operating member, a pinion operated from the rack, motion transmission means between the pinion and the support for turning the support when the operating member and shaft are moved downwardly, a derinding knife mounted on the shaft for swinging movement, means for actuating the derinding knife from the operating member when the same moves toward the shaft upon compression of the spring means between the operating member and the shaft and after the movement of the shaft has been stopped, and a core ejector operating in the coring tool and actuated from the operating member.

6. In a machine of the character described, a base having a supporting arm provided with a tubular bearing and having a bracket provided with a bearing, a support for the fruit having a hollow post rotatably fitted in the bearing of the bracket, a shaft slidably fitted in the bearing of the arm, a coring tool carried by the lower end of the shaft, an operating member mounted for limited sliding movement on the upper end of said shaft, spring means for resisting relative movement of the operating member and the shaft, means carried by the shaft and co-operable with the bearing of the arm for limiting and positively stopping the downward movement of the shaft, a rack connected to the operating member, the bearing of the arm having a slot accommodating the rack, a pinion meshed with the rack, motion transmission means between the pinion and the post of the support, a knife shaft extending transversely of and mounted on the first mentioned shaft, a knife carried on the knife shaft, a pinion fixed on the knife shaft within the first mentioned shaft, and a rod connected to the operating member and having a rack meshed with the pinion of the knife shaft.

7. In a machine of the character described, a base having a supporting arm provided with a tubular bearing and having a bracket provided with a bearing, a support for the fruit having a hollow post rotatably fitted in the bearing of the bracket, a shaft slidably fitted in the bearing of the arm, a hollow coring tool carried by the lower end of the shaft, an operating member mounted on the upper end of said shaft, spring means for resisting relative movement of the operating member and the shaft, means carried by the shaft and co-operable with the bearing of the arm for limiting and positively stopping the downward movement of the shaft, a rack connected to the operating member, the bearing of the arm having a slot accommodating the rack, a pinion meshed with the rack, motion transmission means between the pinion and the post of the support, a knife shaft extending transversely of and mounted on the first mentioned shaft, a knife carried on the knife shaft, a pinion fixed on the knife shaft within the first mentioned shaft, a rod connected to the operating member and having a rack meshed with the pinion of the knife shaft, and an ejector carried at the lower end of the rod for operating in the hollow coring tool.

8. In a machine of the character described, a rotatable support for the fruit, a curved derinding knife shaped to swing down between the meat of the fruit and the rind, means for swinging the derinding knife, and means for rotating the support and consequently the fruit as the derinding knife is swung.

9. In a machine of the character described, a base having a supporting arm provided with a tubular bearing and having a bracket provided with a bearing, a support for the fruit having a hollow post rotatably fitted in the bearing of the bracket, a shaft slidably fitted in the bearing of the arm, a coring tool carried by the lower end of the shaft, an operating member mounted for limited sliding movement on the upper end of said shaft, spring means for resisting relative movement of the operating member and the shaft, means carried by the shaft and co-operable with the bearing of the arm for limiting and positively stopping the downward movement of the shaft, a rack connected to the operating member, the bearing of the arm having a slot accommodating the rack, a pinion meshed with the rack, motion transmission means between the pinion and the post of the support, a knife shaft extending transversely of and mounted on the first mentioned shaft, a rod having a rack meshed with the pinion of the knife shaft, and an adjusting bushing carried by the operating member and threadedly connected with the rod.

10. In a machine of the character described, a support for the fruit, a coring tool, a shaft carrying the tool, an operating member for the shaft, spring means between the operating member and the shaft, means for limiting the movement of the shaft, a swingable derinding knife, and means for actuating the derinding knife from the operating member when the same moves relative to the shaft upon compression of the spring means and after the movement of the shaft has been stopped.

JOHN RAYMOND CARROLL.